(12) United States Patent
Yang et al.

(10) Patent No.: US 10,460,373 B2
(45) Date of Patent: Oct. 29, 2019

(54) RECOMMENDATION METHOD AND APPARATUS

(71) Applicant: Alibaba Group Holding Limited, Grand Cayman (KY)

(72) Inventors: Chao Yang, Hangzhou (CN); Na Ni, Hangzhou (CN); Zhongyi Liu, Hangzhou (CN); Hu Wei, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 406 days.

(21) Appl. No.: 15/352,219

(22) Filed: Nov. 15, 2016

(65) Prior Publication Data

US 2017/0140454 A1    May 18, 2017

(30) Foreign Application Priority Data

Nov. 17, 2015    (CN) .................. 2015 1 07900152

(51) Int. Cl.
  *G06Q 30/00*    (2012.01)
  *G06Q 30/06*    (2012.01)
  *G06F 16/9535*    (2019.01)

(52) U.S. Cl.
  CPC ..... *G06Q 30/0631* (2013.01); *G06F 16/9535* (2019.01)

(58) Field of Classification Search
  CPC .............................................. G06Q 30/06–08
  USPC ............................................... 705/26.1–27.2
  See application file for complete search history.

(56) References Cited

U.S. PATENT DOCUMENTS

| | | | |
|---|---|---|---|
| 6,868,389 B1 | 3/2005 | Wilkins et al. | |
| 7,991,841 B2 | 8/2011 | Anderson et al. | |
| 8,229,780 B2 | 7/2012 | Davidow et al. | |
| 8,255,270 B2 | 8/2012 | Rose et al. | |
| 8,326,663 B2 | 12/2012 | Christon et al. | |
| 8,886,575 B1 * | 11/2014 | Liu ................... | G06Q 30/0201 706/12 |
| 9,026,521 B1 | 5/2015 | Daniel | |

(Continued)

FOREIGN PATENT DOCUMENTS

WO    2012051586 A1    4/2012

OTHER PUBLICATIONS

International Preliminary Report on Patentability to corresponding International Application No. PCT/US2016/062149 dated May 31, 2018 (7 pages).

(Continued)

*Primary Examiner* — Ethan D Civan
(74) *Attorney, Agent, or Firm* — James J. DeCarlo; Greenberg Traurig, LLP (57) ABSTRACT

Disclosed is a recommendation method and apparatus. The recommendation method comprises: identifying at least one core user of a network service provider and a set of users who have demonstrated one or more network-related behaviors with respect to a first predetermined association item; sampling the set of users to identify a set of sample users; calculating a similarity between the sample users to identify a list of similar users; and sending a recommendation of potential users to a network service provider, the recommendation of potential users based on the list of similar users and the at least one core user of a network service provider. Potential users may be efficiently recommended to a network service provider.

20 Claims, 7 Drawing Sheets

(56) References Cited

U.S. PATENT DOCUMENTS

| | | |
|---|---|---|
| 9,189,798 B2 | 11/2015 | Title et al. |
| 2004/0243459 A1 | 12/2004 | Geritz, III et al. |
| 2005/0154648 A1 | 7/2005 | Strause |
| 2007/0088603 A1* | 4/2007 | Jouppi .................. G06Q 30/02 705/14.66 |
| 2007/0255614 A1 | 11/2007 | Ourednik et al. |
| 2008/0288361 A1 | 11/2008 | Rego et al. |
| 2009/0112989 A1 | 4/2009 | Anderson et al. |
| 2009/0183179 A1 | 7/2009 | Keith et al. |
| 2010/0131835 A1 | 5/2010 | Kumar et al. |
| 2011/0010366 A1 | 1/2011 | Varshayslcy et al. |
| 2011/0295997 A1 | 12/2011 | Priyadarshan et al. |
| 2012/0198056 A1 | 8/2012 | Shama et al. |
| 2012/0265610 A1 | 10/2012 | Shama et al. |
| 2012/0311139 A1 | 12/2012 | Brave et al. |
| 2013/0097017 A1 | 4/2013 | Shenoy et al. |
| 2013/0166379 A1 | 6/2013 | Ehindero et al. |
| 2013/0238435 A1 | 9/2013 | Barak et al. |
| 2013/0346182 A1 | 12/2013 | Cheng et al. |
| 2014/0344217 A1 | 11/2014 | Title et al. |
| 2014/0358638 A1 | 12/2014 | Sukumar |
| 2015/0046458 A1 | 2/2015 | Hu |
| 2015/0088649 A1* | 3/2015 | Herman ............. G06Q 30/0256 705/14.54 |
| 2016/0189203 A1 | 6/2016 | Rajab et al. |

OTHER PUBLICATIONS

International Search Report and Written Opinion to corresponding International Application No. PCT/US16/62149 dated Jan. 30, 2017 (8 pages).

* cited by examiner

RECOMMENDATION METHOD AND APPARATUS

CROSS-REFERENCE TO RELATED APPLICATIONS

This application claims the benefit of priority of Chinese Application No. 201510790152.0, titled "Method and Apparatus for Making Recommendations," filed on Nov. 17, 2015, which is hereby incorporated by reference in its entirety.

BACKGROUND

Field of the Disclosure

The present disclosure relates to the field of Internet technologies, and in particular, relates to a recommendation method and apparatus.

Description of Related Art

With the development of Internet technologies, users are able to acquire more and more network services from websites. When a user browses a website and selects network services, a website recommendation system can play an important role. In particular, a website recommendation system can be important for users whose demands or requirements are not ascertained, since these users may directly select the network services recommended by the website recommendation system. Accordingly, currently and for the most part, websites have their own recommendation system to recommend network services to the users and to reduce user activities such as browsing, clicking, and the like. This can, therefore, reduce the load of the website servers, save network bandwidth resources, and improve the value of the websites.

Currently, the mainstream websites typically recommend network services to the users based on a collaborative filtering (CF) algorithm, which may reduce aimless behaviors such as browsing, clicking and the like, and hence reduce the load of the website servers, save network bandwidth resources and improve the value of the websites. In practice, in addition to recommending network services to the users, the websites may also recommend potential users to network service providers from the perspective of the network service providers. However, considering the large number of users who access the websites, if recommendation of the potential users is implemented directly based on the collaborative filtering algorithm, the calculation load is heavy, thus affecting recommendation efficiency.

BRIEF SUMMARY

Various aspects of the present disclosure provide a recommendation method and apparatus to efficiently recommend potential users to a network service provider.

One aspect of the present disclosure provides a recommendation method, comprising: identifying at least one core user of a network service provider and a set of users who have demonstrated one or more network-related behaviors with respect to a first predetermined association item; sampling the set of users to identify a set of sample users; calculating a similarity between the sample users to identify a list of similar users; and sending a recommendation of potential users to a network service provider, the recommendation of potential users based on the list of similar users and the at least one core user of a network service provider.

Another aspect of the present disclosure provides a recommendation apparatus, comprising: identification logic for identifying at least one core user of a network service provider and a set of users who have demonstrated one or more network-related behaviors with respect to a first predetermined association item; sampling logic for sampling the set of users to identify a set of sample users; similarity processing logic for calculating a similarity between the sample users to identify a list of similar users; and recommending logic for sending a recommendation of potential users to a network service provider based on the list of similar users and the at least one core user of a network service provider.

In one embodiment, a first association item is predetermined, and associated users are acquired via the first association item. A set of users who have demonstrated network-related behaviors on a first predetermined association item is acquired from a network system. In one embodiment, considering the large number of users in the set of users and the heavy calculation load, to reduce the calculation load, sampling is performed for the set of users to acquire sample users. Then, similarity processing is performed for the sample users to acquire a list of similar users, and afterwards potential users are recommended to the recommendation-targeted network service provider according to the list of similar users and at least one core user of a recommendation-targeted network service provider. In one embodiment, the number of sample users obtained via sampling is relatively low, the calculation load is reduced and the calculation speed is relatively improved. Therefore, potential users may be efficiently recommended to the recommendation-targeted network service provider.

BRIEF DESCRIPTION OF THE DRAWINGS

Described drawings herein are used for providing further understanding for the present disclosure and constitute a portion of the present application. Exemplary embodiments and descriptions thereof of the present disclosure intend to explain the present disclosure rather than improperly limiting the present disclosure. In the drawings.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The detailed description provided herein is not intended as an extensive or detailed discussion of known concepts, and as such, details that are known generally to those of ordinary skill in the relevant art may have been omitted or may be handled in summary fashion. Certain embodiments of the present disclosure will now be discussed with reference to the aforementioned figures, wherein like reference numerals refer to like components.

Figure 1:
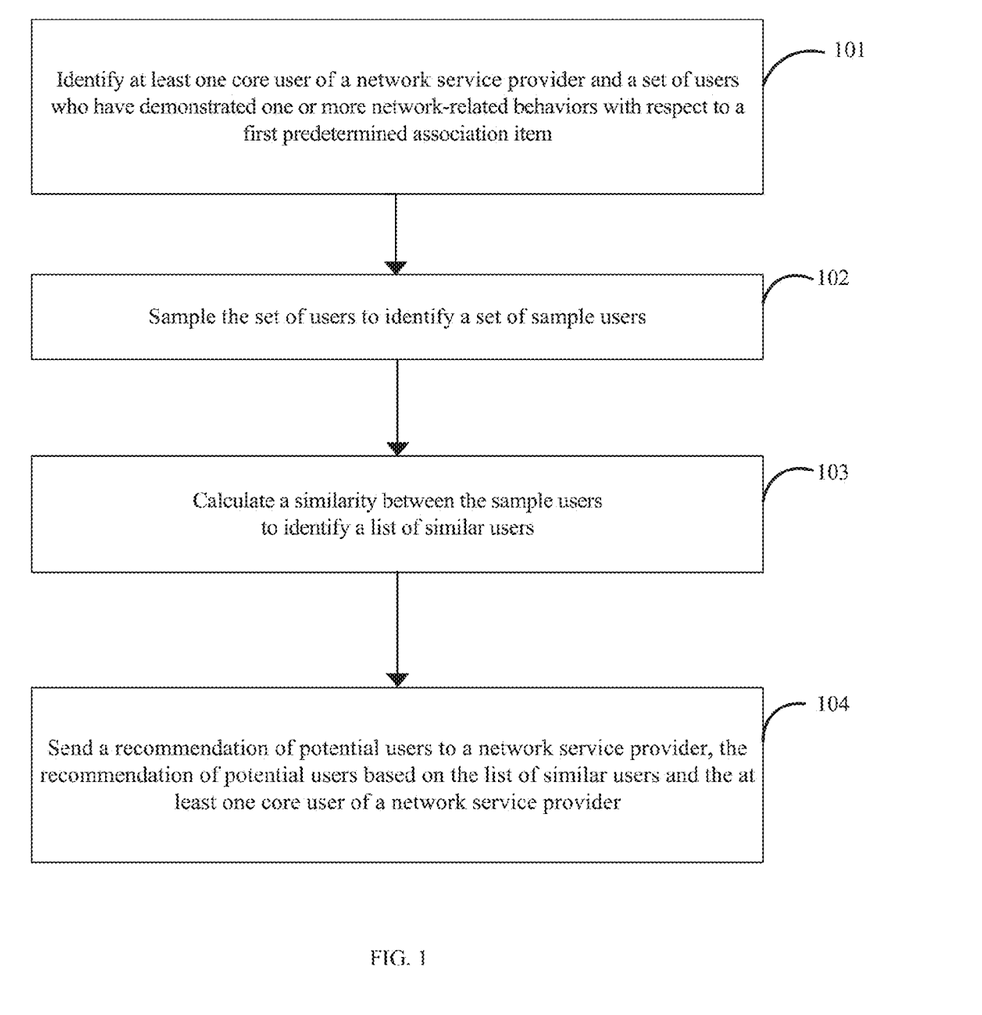
FIG. 1 is a flow diagram of a recommendation method according to an embodiment of the present disclosure.

FIG. 1 is a schematic flow diagram of a recommendation method according to an embodiment of the present disclosure. As illustrated in FIG. 1, the method comprises, in one embodiment:

acquiring, from a network computer system, at least one core user of a network service provider and a set of users who have demonstrated network-related behaviors with respect to a first predetermined association item (step 101);

performing sampling for the set of users to acquire sample users (step 102);

performing similarity processing for the sample users to acquire a list of similar users (step 103); and recommending, according to the list of similar users and at least one core user of a recommendation-targeted network service provider, potential users to the recommendation-targeted network service provider (step 104).

The recommendation method according to this embodiment may be performed by a recommendation apparatus, in order to recommend potential users to a network service provider, thereby facilitating promotion and application of network services. The method according to this embodiment may be applied to any application scenario where users are recommended based on the Internet. For example, when an online store releases its provided commodity objects on an e-commerce website, the e-commerce website may recommend users who potentially desire to purchase the commodities to the online store by using the method according to this embodiment. As a more detailed example, when a video resource provider uploads video resources on a video resource download website, the video resource download website may recommend users who potentially desire to download the video resources to the video resource provider. As another detailed example, when a take-out service provider provides take-out services via a take-out service client, the take-out service client may recommend users who potentially desire to place orders for the take-out services.

The network computer system, the user in the network computer system, the user behavior, the network service and the like may vary with different application scenarios. This embodiment sets no limitation to the implementation of the network computer system, the user in the network computer system, the user behavior, the network service and the like. For example, the network computer system may be a network system with an e-commerce website as a primary component, and correspondingly, the network service in the network computer system may be, for example, an online shopping service, and the user behavior in the network system may comprise one or a plurality of browsing, adding to favorites, adding to shopping chart, purchasing, paying and commenting. Still for example, the network computer system may be a network system with a resource download website as a primary component, and correspondingly, the network service in the network system may be a resource download service, for example, an audio or video resource, a text resource, and the like, download service, and the user behavior in the network system may comprise one or a plurality of previewing, downloading, playing, and the like. In addition, the network service according to this embodiment may be a vehicle cleaning service, an online ticket booking service, a maintenance service, a massage service, a cleaning service, a cook's on-site service, a housekeeping service, a private tutoring service, an entertainment service, a food service, a travel service, a hotel service, a taxi service and the like.

As seen from the above examples, the network services according to this embodiment mainly refer to services provided via the Internet to the users, which may be services in such application fields as e-commerce services, e-governmental affairs, e-enterprise service procedures and the like.

It should be noted that the recommendation apparatus for performing the processes of the method according to this embodiment may be implemented as a functional module on the websites or clients, or may be configured independently of the websites or clients but is capable of communicating with the websites or clients to cooperate with the websites or clients to complete recommendation.

For a network service provider, to better promote or sell the provided network services, service promotion or sales policy may be pushed to the user group of the network service provider. The user group of the network service provider can not only includes existing users, but can also include some potential users. The network service provider typically has to face the problem of how to ascertain its own potential users. The recommendation method according to this embodiment is capable of better recommending potential users to a network service provider.

The recommendation method according to this embodiment operates according to the following principles: based on at least one core user of a network service provider, potential users who are similar to the at least one core user are acquired from the network computer system as potential users of the recommendation-targeted network service provider, and then these potential users are recommended to the network service provider. In specific implementation, in this embodiment, a list of similar users, or a U2U matrix, is acquired, and then users similar to the core user of the recommendation-targeted network service are found from the list of similar users and recommended to the network service provider.

In one embodiment, an association item is predetermined between users, and users who are somewhat associated are acquired based on the predetermined association item. Thus, in one embodiment, a list of similar users is acquired based on these associated users; and afterwards, potential users are recommended to the recommendation-targeted network service provider based on the acquired list of similar users. For distinction from an association item in an expanded list of similar users, which is to be described hereinafter, the association item described herein is referred to as a first association item.

The first association item may vary with different application scenarios. However, once the application scenario is determined, the first association item is also correspondingly determined. For example, the first association item may be a commodity object (which is also referred to as a hot commodity) whose visit frequency is greater than a predetermined visit frequency threshold; or may be a "first-level category", for example, home appliances, outdoor sports, maternal and child products and the like; or may be a "leaf-level category", for example, refrigerators, washing machines, running shoes, baby strollers and the like; or may be attributes of some commodities, for example, brands, price range and the like.

In one embodiment, using the scenario where the first association item is the commodity object whose visit frequency is greater than the predetermined visit frequency as an example, acquiring a set of users from a network system who have demonstrated network-related behaviors on a first predetermined association item comprises: acquiring from the network computer system, a set of users who have demonstrated network-related behaviors on the commodity object whose visit frequency is greater than the predetermined visit frequency threshold. That is, users who have browsed, clicked, viewed, inquired, added to favorites, added to chart or bought the commodity object whose visit frequency is greater than the predetermined visit frequency threshold are acquired from the network system to form a set of users.

In one embodiment, considering the large number of users in the network computer system, for example, over 100 million users active on the e-commerce site Taobao (which sells goods), the acquired set of users may be very large. Therefore, the calculation load during potential user recommendation based on such a large set of users may be significantly heavy, the recommendation efficiency can be extremely low, and the practicability can be poor. Accordingly, according to this embodiment, after a set of users is acquired, sampling is performed for the set of users to acquire sample users. The sample users herein refer to users who are sampled. The sample users are a portion of users in the set of users, and the number of sample users is less than the number of users in the set of users. In addition, the number of sample users may be flexibly controlled according to the application scenario or the service requirement or the like. If the application scenario or the service requirement imposes a high requirement on user coverage, then on the premise of satisfying the time requirement, the number of sample users may be as large as possible, to ensure user coverage. In one embodiment, if the application scenario or the service requirement imposes a high requirement on time effectiveness of recommendation, then on the premise of satisfying the user coverage, the number of sample users may be as few as possible, to reduce the calculation load and improve the recommendation efficiency.

In one embodiment, for example, a sampling ratio may be predetermined, and the number of sample users may be determined according to the sampling ratio. The sampling ratio herein refers to a ratio of sample users to the total number of users in the set of users, which may be, for example, 70%, 60%, 45% or the like. Still for example, a sampling number range may also be predetermined, the number of sample users is required to be within this sampling number range, and the number of sample users is controlled by using the sampling number range. Still for example, an upper threshold or a lower threshold may also be predetermined, such that the number of sample users is required to be no greater than the upper threshold or be no less than the lower threshold, and the number of sample users is controlled according to the upper threshold or the lower threshold.

In addition, from the perspective of the first association item, for example, the number of sets of users associated with different hot commodities may be different, or even greatly different. Such phenomenon is typically referred to as data inclination. If the data inclination is great, the execution efficiency of the method according to this embodiment would be severely affected. In this embodiment, by performing sampling for the set of users, the numbers of sample users associated with different first association items may be the same or substantially the same, which is favorable to reducing the data inclination, and thus favorable to integrally improve the execution efficiency of the method according to this embodiment.

In an optional implementation, sampling may be performed for the set of users according to the weight of each user, and it is ensured that the probability of sampling a high-weighted user is higher; and the probability of sampling a low-weighted user is lower. In this embodiment, the specific implementation process of performing sampling for the set of users to acquire sample users can comprise assigning a weight for each user in the set of users according to network behavior activity and/or network behavior type of each user; and then performing random sampling for the set of users, according to the weight of each user, to acquire the sample users.

In one embodiment, the higher the network behavior activity of a user, the higher the weight of the user is; and the lower the network behavior activity of a user, the lower the weight of the user is. For example, the network behavior activity of a user may be measured by the number of times the user accesses the network system within a period of time (for example, the latest two days, one week, one month or the like), but is not limited to such a method of measurement. In addition, the network behavior type of a user may also affect the weight of the user. For example, the weight corresponding to a purchasing behavior is higher, the weight corresponding to a clicking behavior is lower, and the weight corresponding to a browsing behavior is even lower, and the like.

In one embodiment, a weight assigning policy may be predetermined. For example, in the weight assigning policy, the weight corresponding to each network behavior activity and the weight corresponding to each network behavior type may be defined, and a calculation manner may also be defined, which may be, for example, a weighted averaging or exponential calculation, or the like. Accordingly, the weight corresponding to a network behavior activity and the weight corresponding to a network behavior type may be specifically determined according to the weight assigning policy, and hence the acquired weights may be calculated according to the calculation manner defined in the weight assigning policy. For example, the two weights may be weighted on average to acquire the weight of the user.

During the process of performing random sampling for the set of users, according to the weight of each user to acquire sample users, a sampling probability of each user may be calculated, in one embodiment, according to the following formula (1), that is, the probability that the user is sampled.

$$p(w_i) = \frac{w_i}{\sum_{i=1}^{n} w_i} \qquad (1)$$

In the above formula (1), $p(w_i)$ denotes the sampling probability of user i, $w_i$ denotes the weight of user i, and n denotes the total number of users in the set of users.

Further, for the convenience of performing similarity processing for the sample users, the sample users may be placed into two sample sets, and similarity processing is performed for the users in these two sample sets to acquire a list of similar users.

In a specific implementation, random sampling may be performed twice for the set of users, according to the weight of each user in the set of users, to acquire a first sample set and a second sample set.

Figure 2:
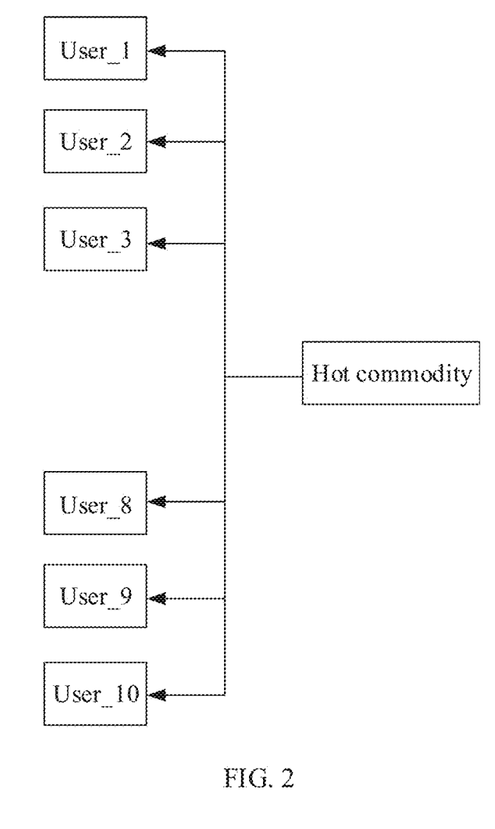
FIG. 2 is a diagram of a set of users associated with a "hot" commodity according to an embodiment of the present disclosure.
Figure 3:
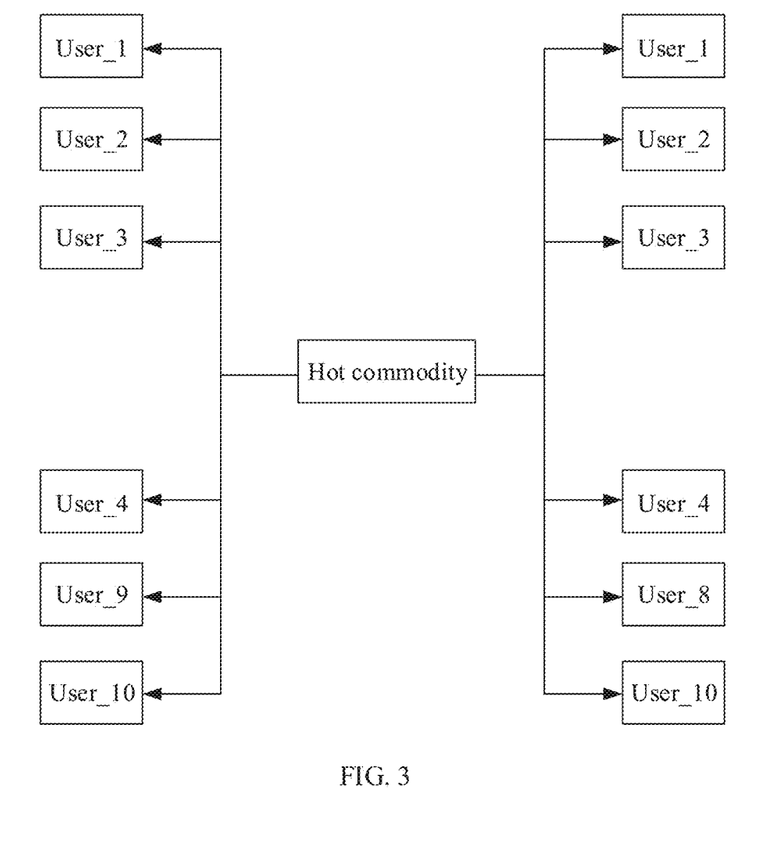
FIG. 3 is a diagram of two sample sets obtained by performing sampling for the set of users as illustrated in FIG. 2 according to an embodiment of the present disclosure.

As illustrated in FIG. 2, one may assume that the set of users who have demonstrated network-related behavior on a hot commodity contains 10 users total, respectively, User_1, User_2, . . . , User_10. If a predetermined number of sample users is 6, then two sample sets as illustrated in FIG. 3 are acquired upon sampling, wherein one sample set contains User_1, User_2, User_3, User_4, User_9 and User_10, and the other sample set contains User_1, User_2, User_3, User_4, User_8 and User_10.

Figure 4:
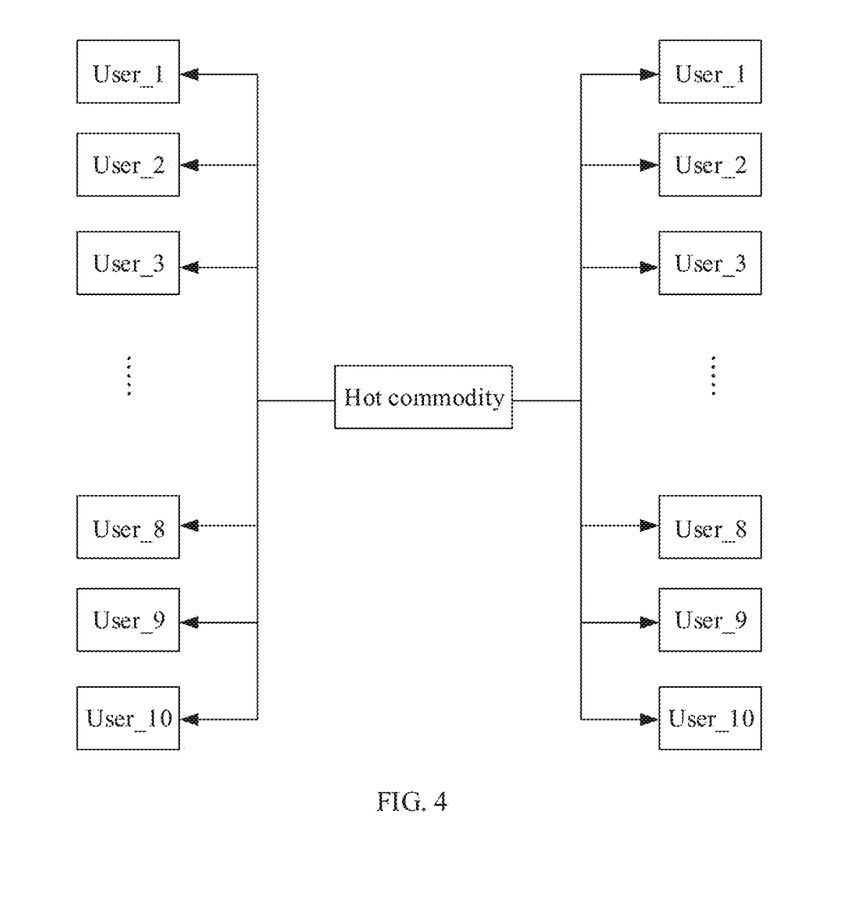
FIG. 4 is a diagram of a duplicated list of users obtained by duplicating the set of users as illustrated in FIG. 2 according to another embodiment of the present disclosure.

In one embodiment, the set of users may be duplicated to acquire a duplicate set of users, and then random sampling is performed for the set of users and the duplicated set of users respectively, according to the weight of each user in the set of users, to acquire a first sample set and a second sample set. Using the set of users as illustrated in FIG. 2 as an example, upon duplication, two sets of users as illustrated in FIG. 4 may be acquired. If it is defined that the number of sample users is 6, then the two sample sets as illustrated in FIG. 3 may be acquired after sampling is performed for the two sets of users as illustrated in FIG. 4.

After the first sample set and the second sample set are acquired, similarity processing may be performed for the users in the first sample set and the second sample set, to achieve the objective of performing similarity processing for the sample users and to acquire a list of similar users.

Further, to reduce the calculation load and improve the calculation speed, multi-stage block calculation may be performed for the first sample set and the second sample set. In this embodiment, an implementation of performing similarity processing to acquire a list of similar users comprises:

dividing the first sample set to acquire at least two first sample subsets;

dividing the second sample set to acquire at least two second sample subsets;

performing similarity calculation between each sample subset in the at least two first sample subsets and each sample subset in the at least two second sample subsets to acquire a similarity between the sample users; and acquiring sampled users whose similarity satisfies a predetermined condition as similar users and adding the sampled users to the list of similar users.

Figure 5:
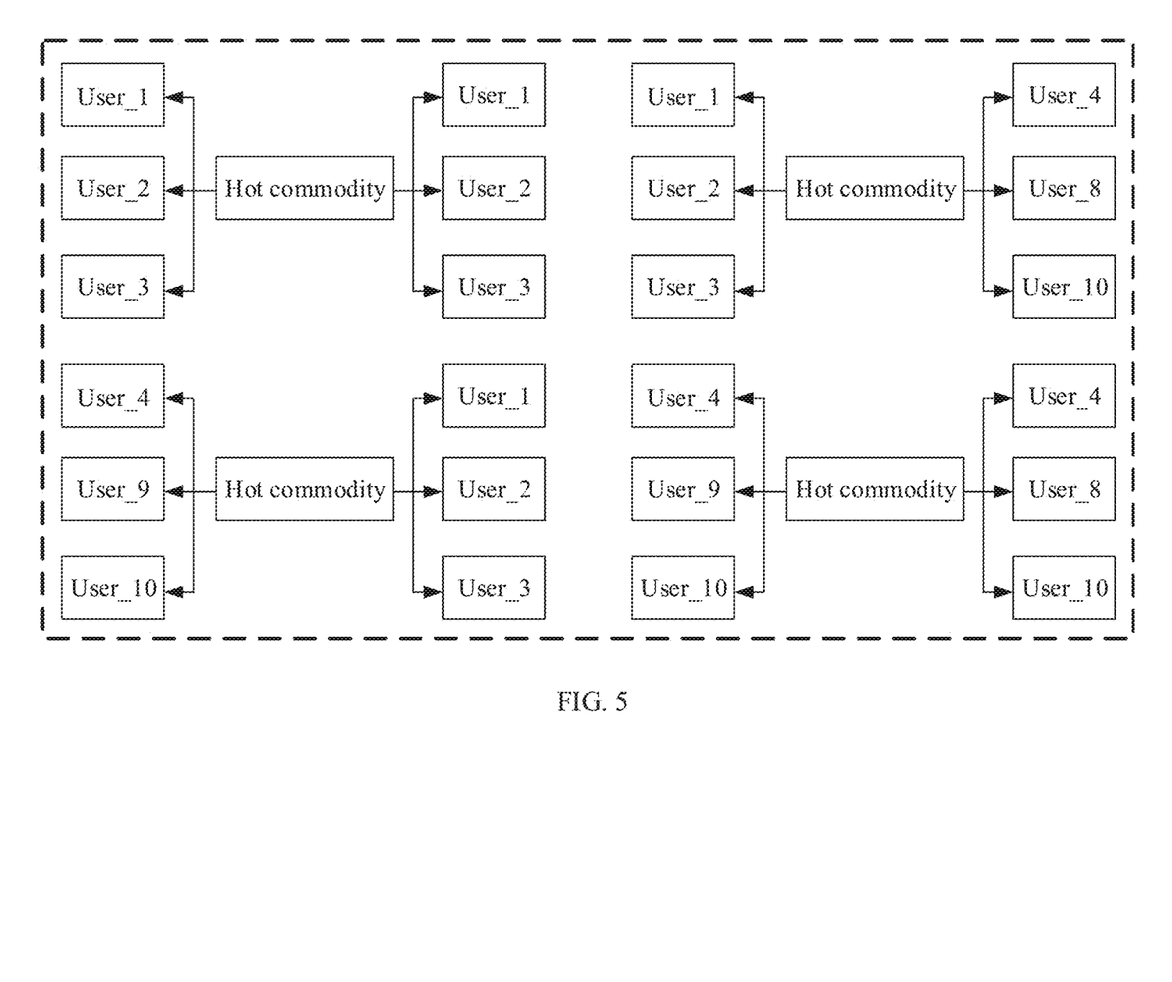
FIG. 5 is a diagram of an association between sample subsets obtained by dividing the sample set as illustrated in FIG. 3 according to another embodiment of the present disclosure.

Using the first sample set and the second sample set as illustrated in FIG. 3 as an example, the first sample set may be divided into two first sample subsets, wherein one sample subset contains User_1, User_2 and User_3, and the other sample subset contains User_4, User_9 and User_10; and the second sample set may be divided into two second sample subsets, wherein one sample subset contains User_1, User_2 and User_3, and the other sample subset contains User_4, User_8 and User_10. Afterwards, similarity calculation is performed between each first sample subset and each second sample subset to acquire an association schematic diagram as illustrated in FIG. 5.

For example, a similarity between a user in the first sample subset and a user in the second sample subset may be calculated according to the following formula (2).

$$sim(x, y, \delta) = \frac{1}{\sqrt{2\pi}\,\delta} e^{\left(-\frac{(x-y)^2}{2\delta^2}\right)} \qquad (2)$$

In the above formula (2), $sim(x, y, \delta)$ denotes the similarity between x, y, and $\delta$, wherein x denotes a user in the first sample subset, y denotes a user in the second sample subset, and $\delta$ denotes a variance.

It should be noted that this embodiment sets no limitation to the number of times or the manner in which the sample set is divided, and in addition, sets no limitation to the number of users in each sample subset. Further, the first sample subset or the second sample subset may be further divided into finer sets.

By means of dividing the sample set, the sample subsets derived from division may be individually stored, and may be individually processed, which is favorable to further reducing the calculation load and improving the recommendation efficiency.

After the list of similar users is acquired, a match may be performed in the list of similar users according to the core user of the recommendation-targeted network service provider, to find users who are similar to the core user as potential users of the recommendation-targeted network service provider and are thus recommended to the recommendation-targeted network service provider.

In one embodiment, with the increase of user groups in the network computer system and constant variation of the association item itself, similar users covered within the list of similar users may be insufficient or some similar users may be not covered within the list of similar users. In this embodiment, to further improve the coverage rate of the similar users, after a list of similar users is acquired before potential user recommendation according to the list of similar users, the list of similar users may be expanded to acquire an expanded list of similar users. Correspondingly, for example, recommending potential users to the recommendation-targeted network service provider according to at least one core user of the recommendation-targeted network service provider and the expanded list of similar users.

A manner of expanding the list of similar users comprises, in one embodiment: acquiring, according to a similarity relationship between similar users in the list of similar users, two users in the list of similar users who are similar to the same user but are not similar users in the list of similar users, and use the acquired two users as new similar users; and adding the new similar users into the list of similar users to acquire the expanded list of similar users. For example, assume that the list of similar users contains User_1 and User_2 who are similar, and User_2 and User_3 who are similar, then it may be known that User_1 and User_3 are both similar to User_2 but are not in the same list of similar users; in this case, User_1 and User_3 may be added to the list of similar users as new similar users, such that an expanded list of similar users may be acquired. In such a case, the expanded list of similar users contains User_1 and User_2 who are similar, User_2 and User_3 who are similar, and User_1 and User_3 who are similar.

Another manner of expanding the list of similar users comprises: expanding the list of similar users according to similar users acquired according to a list of users who demonstrate network behaviors on a second predetermined association item to acquire the expanded list of similar users. For example, after the first association item is modified or redefined to the second association item, the method processes according to this embodiment may be performed again to acquire a new list of similar users, and then the previously acquired list of similar users is updated or expanded by using the new list of similar users. The second association item is, in one embodiment, preferably an association item different from the first association item.

It should be noted that, in this embodiment, the operation of expanding a list of similar users may result in exponential growth of the calculation load. However, since optimization processes such as random sampling and set division and the like are employed during calculation of the list of similar users, the calculation load is greatly reduced and thus a foundation is laid for the expansion of the list of similar users. As such, the expansion of the list of similar users is feasible, while the coverage rate and the calculation speed of the similar users are considered. In one embodiment, to ensure the recommendation efficiency, more potential users may be recommended to a network service provider.

It should be noted that, with respect to the above described method embodiments, the actions or steps are described as a series of action combinations. However, a person skilled in the art can understand that the embodiments of the present disclosure are not subjected to limitations of the action sequences described above. Further, based on the embodiments of the present application, some steps may be performed in other sequences or may be simultaneously performed. In addition, a person skilled in the art may also know that the embodiments described in the description herein are all preferred embodiments, and all the involved actions and modules are not mandatory ones of the embodiments of the present disclosure.

In the above embodiments, descriptions give particularly different emphases to various embodiments, and the portion of some embodiment that is not described may be referenced to the related description in other embodiments.

Figure 6:
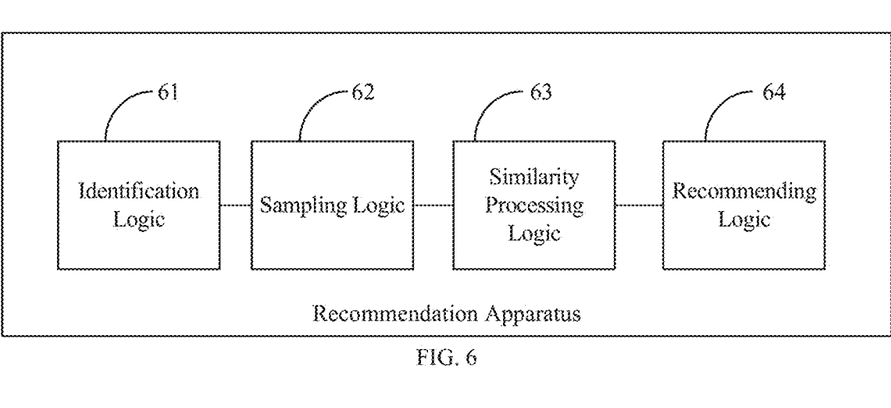
FIG. 6 is a structural diagram of a recommendation apparatus according to another embodiment of the present disclosure.

FIG. 6 is a schematic structural diagram of a recommendation apparatus according to another embodiment of the present disclosure. As illustrated in FIG. 6, the apparatus includes, in one embodiment: an identification module or logic 61, a sampling module or logic 62, a similarity processing module or logic 63, and a recommending module or logic 64.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

The identification module 61 is configured to acquire from a network system a set of users who have demonstrated network-related behaviors on a first predetermined association item.

The sampling module 62 is configured to perform sampling for the set of users acquired by the identification module 61 to acquire sample users.

The similarity processing module 63 is configured to perform similarity processing for the sample users acquired by the sampling module 62 to acquire a list of similar users.

The recommending module 64 is configured to recommend, according to the list of similar users acquired by the similarity processing unit 63 and at least one core user of a recommendation-targeted network service provider, potential users to the recommendation-targeted network service provider.

In one embodiment, the first association item is a commodity object whose visit frequency is greater than a predetermined visit frequency threshold, which will hereinafter be referred to as a hot commodity.

Based on the above, the identification module 61 may be specifically configured to acquire, from the network computer system, a set of users who have demonstrated network-related actions on the commodity object whose visit frequency is greater than the predetermined visit frequency threshold.

In an optional implementation, the sampling module 62 may be specifically configured to:

assign a weight for each user in the set of users according to network behavior activity and/or network behavior type of each user; and perform random sampling for the set of users, according to the weight of each user, to acquire the sample users.

Further, when performing random sampling for the set of users, according to the weight of each user, to acquire the sample users, the sampling module 62 is specifically configured to, in one embodiment:

perform random sampling for the set of users twice, according to the weight of each user, to acquire a first sample set and a second sample set; or duplicate the set of users to acquire a duplicated set of users; and perform random sampling for the set of users and the duplicated set of users respectively, according to the weight of each user, to acquire a first sample set and a second sample set.

Based on the above description, the similarity processing module 63 may be specifically configured to:

divide the first sample set to acquire at least two first sample subsets;

divide the second sample set to acquire at least two second sample subsets;

perform similarity calculation between each sample subset in the at least two first sample subsets and each sample subset in the at least two second sample subsets to acquire a similarity between the sample users; and acquire sampled users whose similarity satisfies a predetermined condition as similar users and add the sampled users to the list of similar users.

Figure 7:
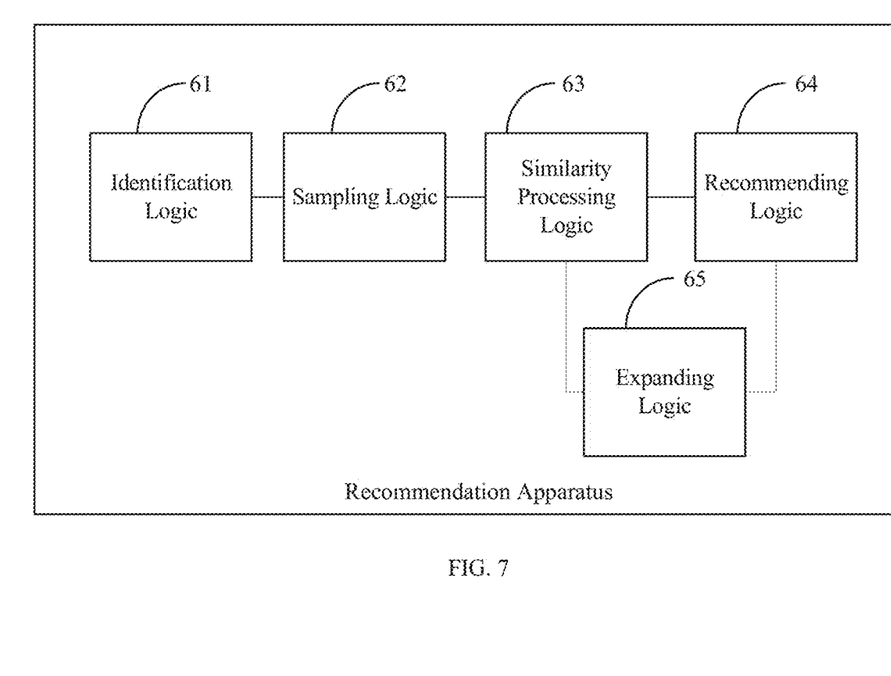
FIG. 7 is a structural diagram of a recommendation apparatus according to another embodiment of the present disclosure.

Further, as illustrated in FIG. 7, the recommendation apparatus can further include, in one embodiment: an expanding module 65. The expanding module 65 is configured to expand the list of similar users acquired by the similarity processing module 63 to acquire an expanded list of similar users.

Based on the above, the recommending module 64 may be specifically configured to recommend, according to the list of similar users and at least one core user of a recommendation-targeted network service provider, potential users to the recommendation-targeted network service provider.

Further, the expanding module 65 may be specifically configured to:

acquire, according to a similarity relationship between similar users in the list of similar users, two users in the list of similar users who are similar to the same user but are not similar users in the list of similar users, and use the acquired two users as new similar users; and add the new similar users into the list of similar users to acquire the expanded list of similar users.

Optionally, the expanding module 65 may be specifically configured to expand the list of acquired similar users, according to a set of users who have demonstrated network behaviors on a second predetermined association item, to acquire the expanded list of similar user.

With the recommendation apparatus according to this embodiment, associated users are acquired based on a first predetermined association item, that is, a set of users who have demonstrated network-related behaviors on a predetermined first association item is acquired from a network system; considering that the set of users comprise a large number of users and the operation load is, in one embodiment, heavy, to reduce the operation load, sampling is performed for the set of users to acquire sample users, then similarity processing is performed for the sample users to acquire a list of similar users, and afterwards potential users are recommended to the recommendation-targeted network service provider according to the list of similar users and a core user of a recommendation-targeted network service provider. The number of sample users obtained via sampling is relatively low, the calculation load is reduced and the calculation speed is relatively improved. Therefore, potential users may be efficiently recommended to the recommendation-targeted network service provider.

A person skilled in the art would clearly acknowledge that for ease and brevity of description, the specific operation processes of the above described systems, apparatuses and units may be referenced to the related portions in the above described method embodiments, which are thus not described herein any further.

In the several embodiments provided in the present disclosure, it should be understood that the disclosed system, apparatus and method may be practiced in other manners. The above described device embodiments are merely illustrative. For example, the unit division is merely logical function division, but there may be other ways of division in actual practice. For example, multiple units or components may be combined or integrated into another device, or some features can be ignored or not performed. In addition, the displayed or discussed mutual couplings or direct couplings or communication connections are practiced through some interfaces. The indirect couplings or communication connections between the apparatuses or units may be practiced in electronic, mechanical or other forms.

The units which are described as separate components may be physically separated or may be not physically separated, and the components which are illustrated as units may be or may not be physical units, that is, the components may be located in the same position or may be distributed into a plurality of network units. A part or all the units may be selected according to the actual needs to achieve the objectives of the technical solutions of the embodiments.

In addition, various functional units according to the embodiments of the present invention may be integrated in a processing unit, or may be each independently and physically present; alternatively, two or more than two units are integrated in a unit. The above integrated unit may be practiced in the form of hardware, and may also be practiced in the form of software with a software functional unit.

The integrated unit practiced in the form of software function unit may be stored in a non-transitory computer-readable storage medium. The software functional unit is stored in a storage medium, comprising several instructions, when being executed, cause a computer device (which may be a personal computer, a server, a network device or the like) or a processor to perform a part of the steps of the methods in various embodiments of the present application. The storage media include various media capable of storing program code, for example, a USB drive, a U disk, a mobile hard disk, a read-only memory (ROM), a random access memory (RAM), a magnetic disk, or a compact disc read-only memory (CD-ROM).

It should be noted that the above-described embodiments are merely for illustration of the present application, and are not intended to limit the present application. Although the present application is described in detail with reference to these embodiments, persons of ordinary skill in the art may also make various modifications to the technical solutions disclosed in the embodiments, or make equivalent replacements to a part of the technical features contained therein. Such modifications or replacements, made without departing from the principles of the present invention, shall fall within the spirit and scope of the present disclosure.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure

What is claimed is:

1. A method for recommending potential users to a network service provider, the method comprising:
   identifying, by a processor, at least one core user of a network service provider and a set of users similar to the core user and associated with one or more network-related behaviors with respect to a first predetermined association item, the network-related behaviors comprising monitored interactions with a network service;
   sampling, by the processor, the set of users to identify a set of sample users;
   calculating, by the processor, a similarity between the sample users to identify a list of similar users; and
   sending, by the processor, a recommendation of potential users to a network service provider, the recommendation of potential users based on the list of similar users and the at least one core user of a network service provider.

2. The method according to claim 1, wherein the first predetermined association item is a commodity object whose visit frequency is greater than a predetermined visit frequency threshold.

3. The method according to claim 1, wherein sampling the set of users to identify a set of sample users comprises:
   assigning a weight for each user in the set of users according to network behavior activity of each user or a network behavior type of each user; and
   performing random sampling for the set of users, according to the weight of each user, to identify the sample users.

4. The method according to claim 3, wherein performing random sampling for the set of users, according to the weight of each user, to identify the sample users comprises:
   performing random sampling for the set of users twice, according to the weight of each user, to identify a first sample set and a second sample set; or
   duplicating the set of users to identify a duplicated set of users and performing random sampling for the set of users and the duplicated set of users respectively, according to the weight of each user, to identify the sample users.

5. The method according to claim 4, wherein calculating a similarity between the sample users to identify a list of similar users comprises:
   dividing the first sample set to identify at least two first sample subsets;
   dividing the second sample set to identify at least two second sample subsets;
   calculating a similarity between each sample subset in the at least two first sample subsets and each sample subset in the at least two second sample subsets to identify a similarity between the sample users; and
   identifying sampled users whose similarity satisfies a predetermined condition as similar users and adding the identified sampled users to the list of similar users.

6. The method according to claim 1, the method further comprising:
   expanding, by a processor, the list of similar users to identify an expanded list of similar users prior to the sending a recommendation; and
   sending, by a processor, a recommendation of potential users to a network service provider based on the expanded list of similar users and the at least one core user of the network service provider.

7. The method according to claim 6, wherein the expanding the list of similar users to identify an expanded list of similar users comprises:
   identifying, according to a similarity relationship between users in the list of similar users, two users in the list of similar users who are not identified as similar users in the list of similar users; and
   adding the two users into the list of similar users as new similar users to identify the expanded list of similar users.

8. The method according to claim 6, wherein expanding the list of similar users to identify an expanded list of similar users comprises:
   expanding the list of similar users according to similar users identified from a set of users associated with network behaviors on a second predetermined association item.

9. A recommendation apparatus, comprising:
   a processor;
   a storage medium for tangibly storing thereon program logic for execution by the processor, the stored program logic comprising:
      identification logic executed by the processor for identifying at least one core user of a network service provider and a set of users similar to the core user and associated with one or more network-related behaviors with respect to a first predetermined association item, the network-related behaviors comprising monitored interactions with a network service;
      sampling logic executed by the processor for sampling the set of users to identify a set of sample users;
      similarity processing logic executed by the processor for calculating a similarity between the sample users to identify a list of similar users; and
      recommending logic executed by the processor for sending a recommendation of potential users to a network service provider based on the list of similar users and the at least one core user of a network service provider.

10. The apparatus according to claim 9, wherein the first predetermined association item is a commodity object whose visit frequency is greater than a predetermined visit frequency threshold.

11. The apparatus according to claim 9, where the sampling logic further comprises:
   assigning logic, executed by the processor, for assigning a weight for each user in the set of users according to network behavior activity of each user or a network behavior type of each user; and random sampling performing logic executed by the processor for performing random sampling for the set of users, according to the weight of each user, to identify the sample users.

12. The apparatus according to claim 11, where the sampling logic further comprises:
second random sampling performing logic executed by the processor for performing random sampling for the set of users twice, according to the weight of each user, to identify a first sample set and a second sample set; or
duplicating logic executed by the processor for duplicating the set of users to identify a duplicated set of users and for performing random sampling for the set of users and the duplicated set of users respectively, according to the weight of each user, to identify the sample users.

13. The apparatus according to claim 12, wherein the similarity processing logic further comprises:
first sample set dividing logic executed by the processor for dividing the first sample set to identify at least two first sample subsets;
second sample set dividing logic executed by the processor for dividing the second sample set to identify at least two second sample subsets;
similarity calculating logic executed by the processor for calculating a similarity between each sample subset in the at least two first sample subsets and each sample subset in the at least two second sample subsets to identify a similarity between the sample users; and
sampled users identifying logic executed by the processor for identifying sampled users whose similarity satisfies a predetermined condition as similar users and add the identified sampled users to the list of similar users.

14. The apparatus according to claim 13, further comprising:
expanding logic executed by the processor for expanding the list of similar users to identify an expanded list of similar users; and
wherein the recommending logic is further operative to send a recommendation of potential users to a network service provider, based on the expanded list of similar users and the at least one core user of a network service provider.

15. The apparatus according to claim 14, wherein the expanding logic further comprises
similarity relationship identifying logic executed by the processor for identifying, based on a similarity relationship between users in the list of similar users, two users in the list of similar users who are not identified as similar users in the list of similar users and adding the two users into the list of similar users as new similar users to identify the expanded list of similar users.

16. The apparatus according to claim 14, wherein the expanding logic is further operative to expand the list of similar users, according to a set of users associated with network behaviors on a second predetermined association item.

17. A non-transitory computer readable storage medium tangibly storing computer program instructions capable of being executed by a computer processor, the computer program instructions defining the steps of:
identifying, by a processor, at least one core user of a network service provider and a set of users similar to the core user and associated with one or more network-related behaviors with respect to a first predetermined association item, the network-related behaviors comprising monitored interactions with a network service;
sampling, by the processor, the set of users to identify a set of sample users;
calculating, by the processor, a similarity between the sample users to identify a list of similar users; and
sending, by the processor, a recommendation of potential users to a network service provider, the recommendation of potential users based on the list of similar users and the at least one core user of a network service provider.

18. The medium according to claim 17, wherein the first predetermined association item is a commodity object whose visit frequency is greater than a predetermined visit frequency threshold.

19. The medium according to claim 17, wherein sampling the set of users to identify a set of sample users comprises:
assigning a weight for each user in the set of users according to network behavior activity of each user or a network behavior type of each user; and
performing random sampling for the set of users, according to the weight of each user, to identify the sample users.

20. The medium according to claim 19, wherein performing random sampling for the set of users, according to the weight of each user, to identify the sample users comprises:
performing random sampling for the set of users twice, according to the weight of each user, to identify a first sample set and a second sample set; or
duplicating the set of users to identify a duplicated set of users and performing random sampling for the set of users and the duplicated set of users respectively, according to the weight of each user, to identify the sample users.

\* \* \* \* \*